No. 691,251. Patented Jan. 14, 1902.
J. A. DYBLIE.
REVERSING VALVE FOR HEATING FURNACES.
(Application filed Nov. 16, 1900.)

(No Model.) 5 Sheets—Sheet 1.

No. 691,251. Patented Jan. 14, 1902.
J. A. DYBLIE.
REVERSING VALVE FOR HEATING FURNACES.
(Application filed Nov. 16, 1900.)
(No Model.) 5 Sheets—Sheet 2.
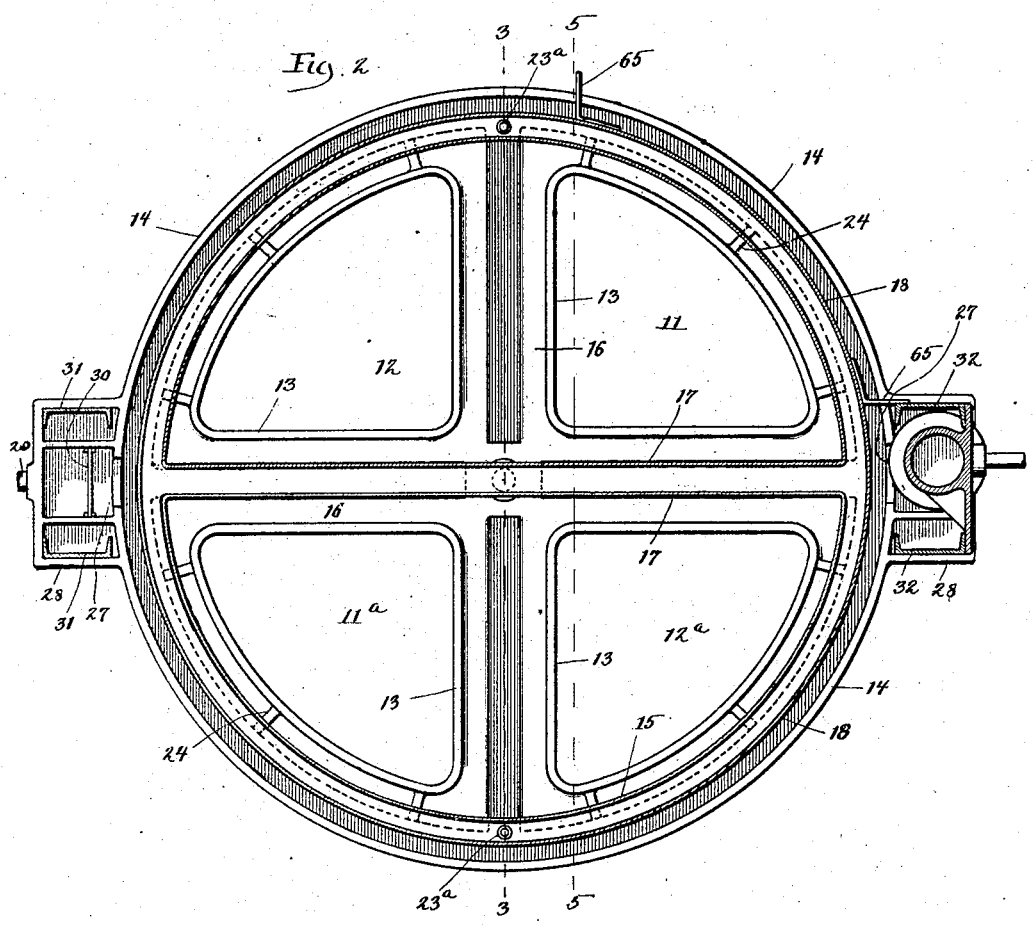
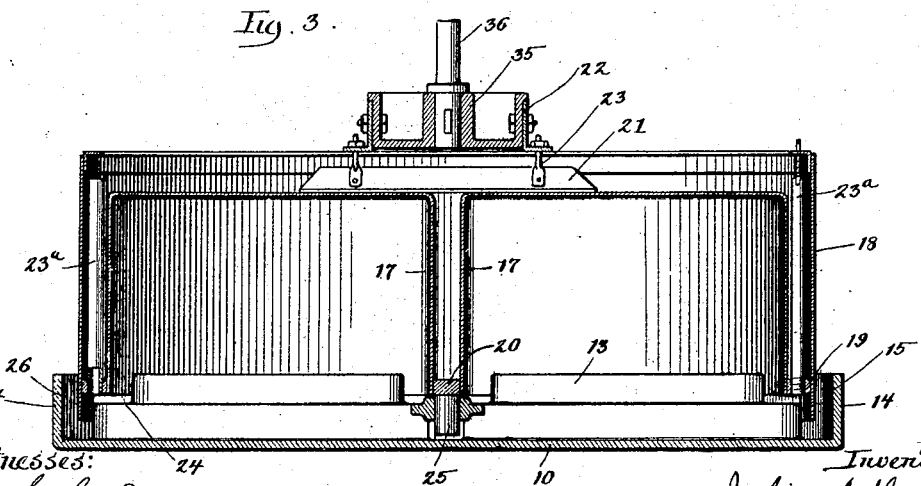

No. 691,251. Patented Jan. 14, 1902.
J. A. DYBLIE.
REVERSING VALVE FOR HEATING FURNACES.
(Application filed Nov. 16, 1900.)
(No Model.) 5 Sheets—Sheet 3.

Witnesses:
Inventor:
Julius A. Dyblie.
By Peirce & Fisher,
his Attorneys.

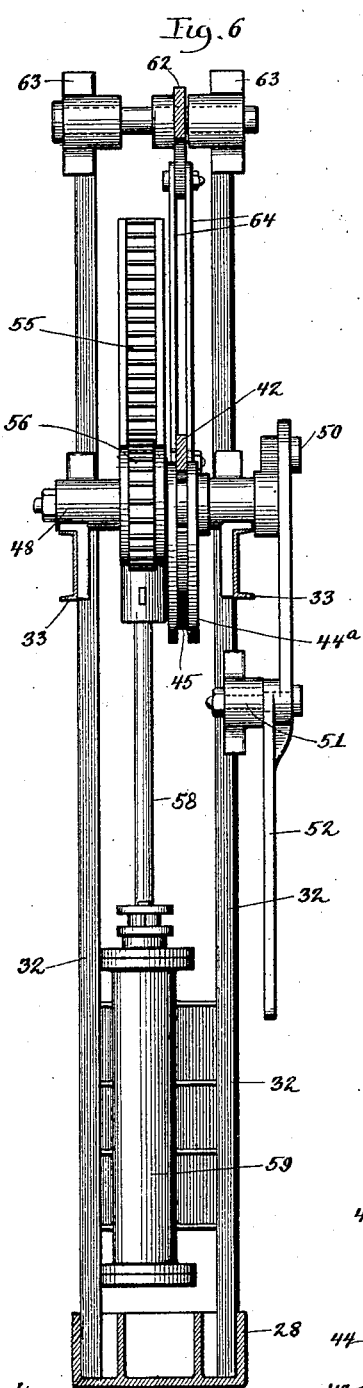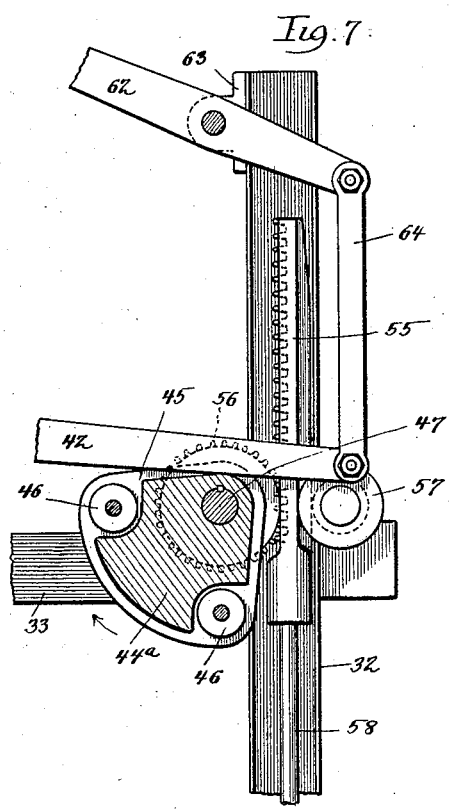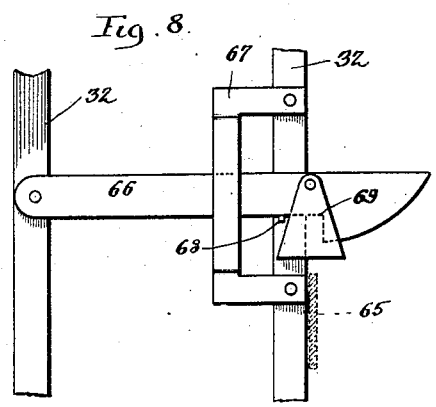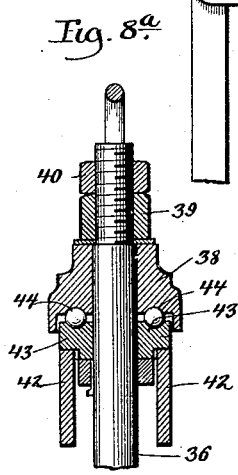

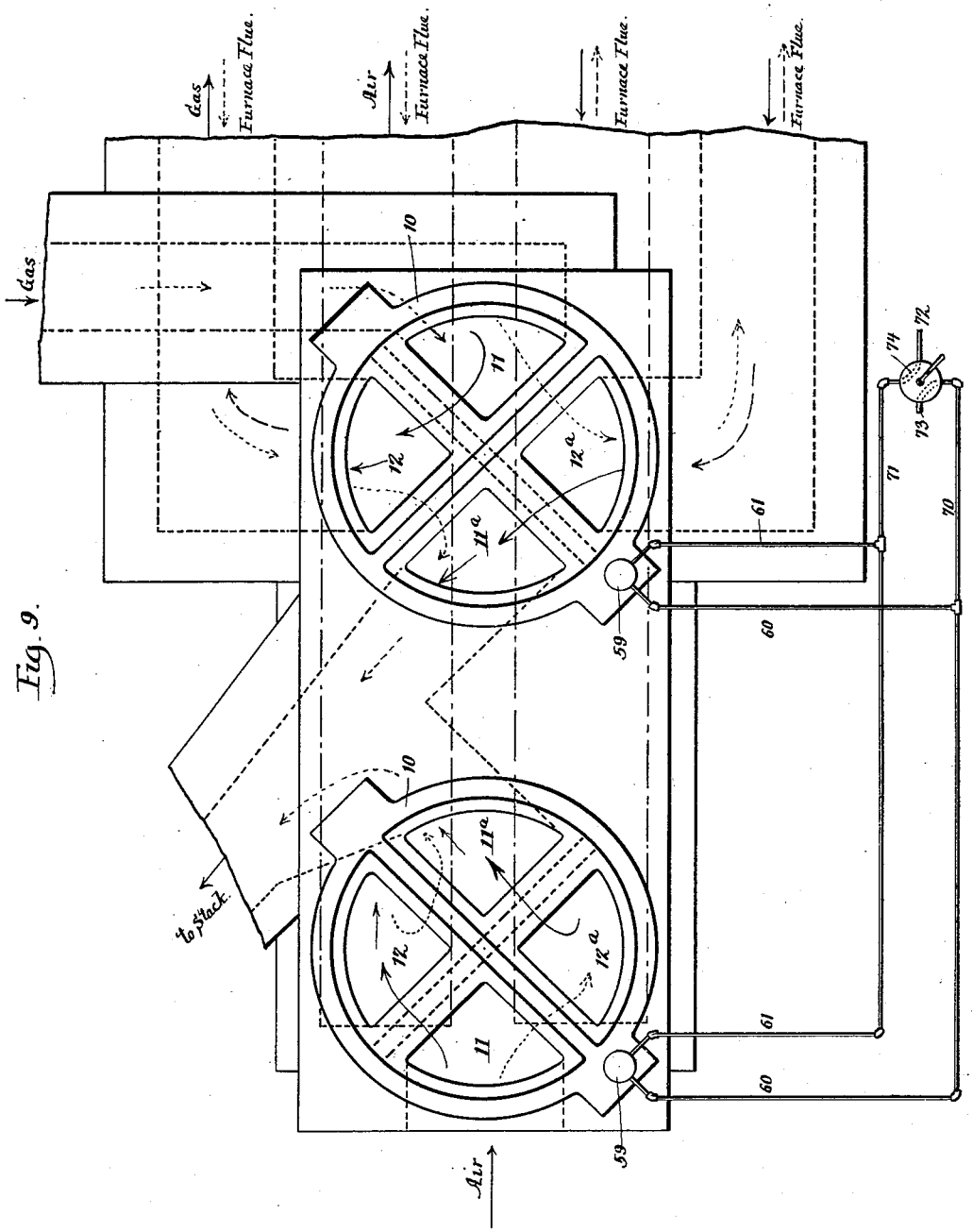

UNITED STATES PATENT OFFICE.

JULIUS A. DYBLIE, OF JOLIET, ILLINOIS.

REVERSING-VALVE FOR HEATING-FURNACES.

SPECIFICATION forming part of Letters Patent No. 691,251, dated January 14, 1902.

Application filed November 16, 1900. Serial No. 36,677. (No model.)

*To all whom it may concern:*

Be it known that I, JULIUS A. DYBLIE, a resident of Joliet, in the county of Will, State of Illinois, have invented certain new and useful Improvements in Reversing-Valves for Heating-Furnaces, of which the following is a full, clear, and exact description.

My invention relates to that type of reversing-valves which are used in connection with regenerative and other heating furnaces, whereby the direction of the air and gas and the escaping products of combustion through the furnace may be readily reversed.

The particular object of my invention is to provide water-sealed rotary reversing-valves for the air and gas and to provide means whereby said valves may be readily operated.

The particular features of which my invention consists are set forth in the following description, illustrated in the accompanying drawings, and particularly pointed out in the appended claims.

Figure 1:
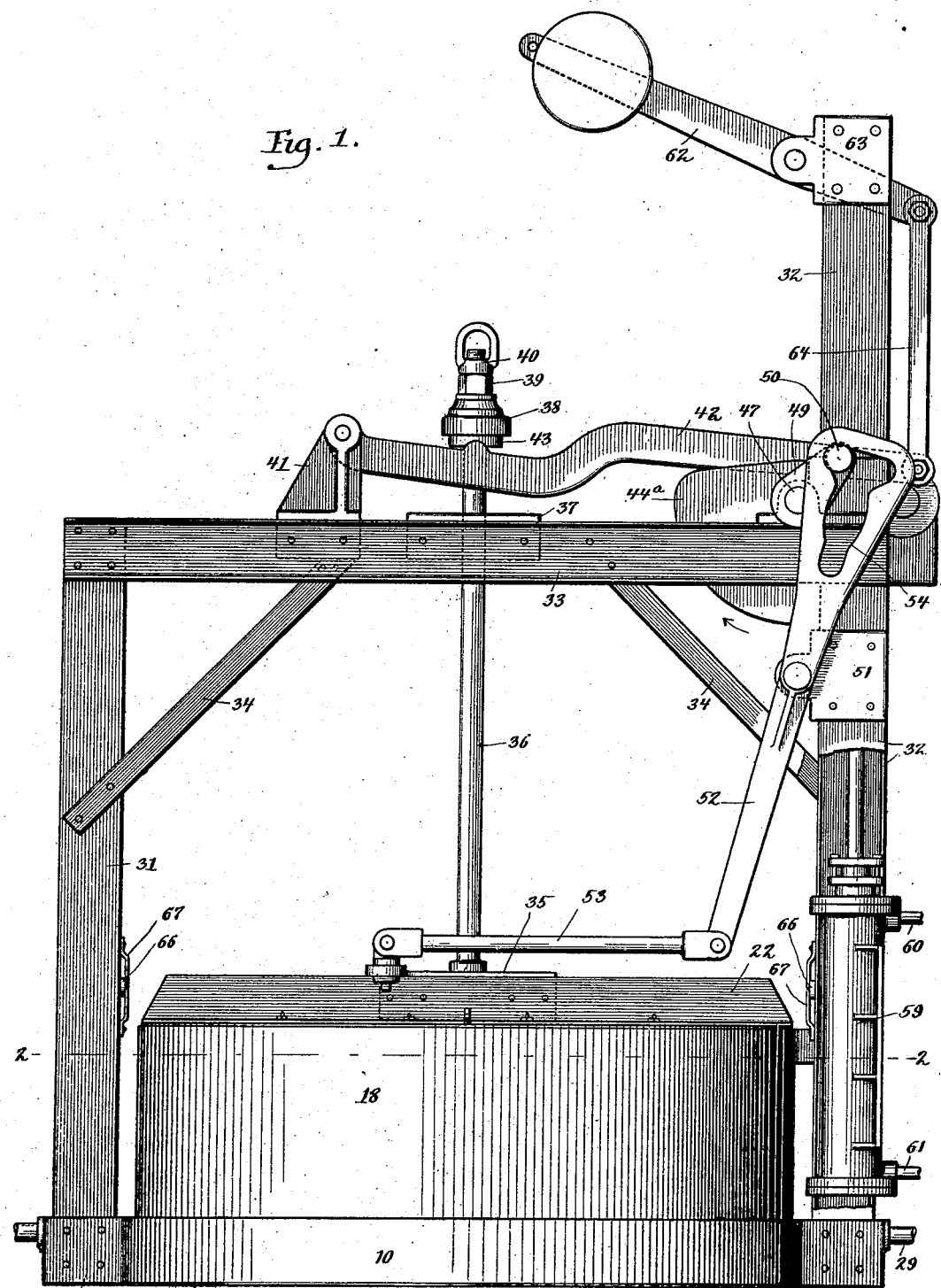
Figure 4:
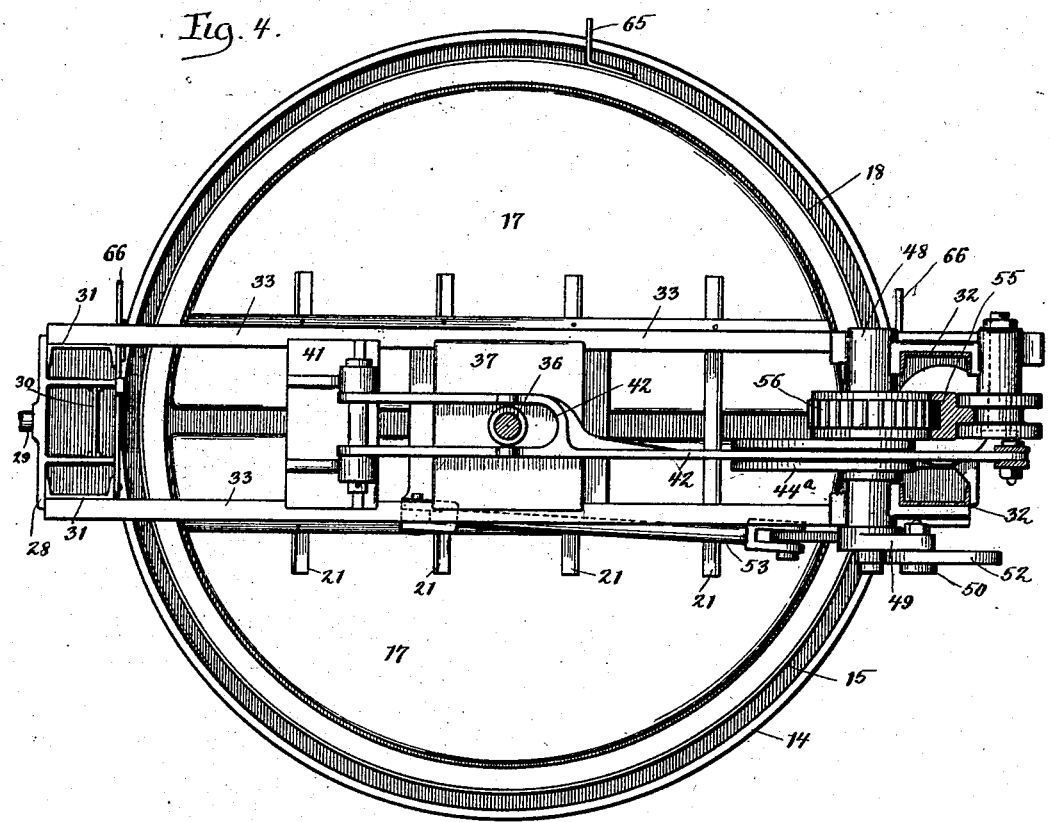
Figure 5:
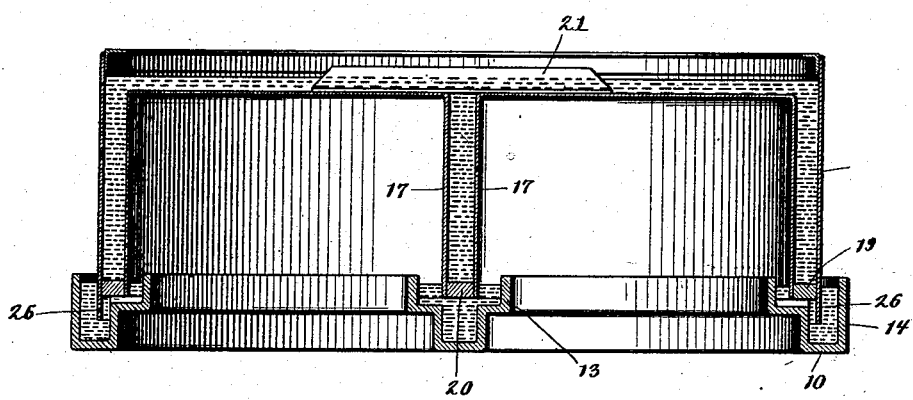

In the drawings, Figure 1 is a view in elevation of one of the valves and its operating means. Fig. 2 is a sectional plan view taken on line 2 2 of Fig. 1. Fig. 3 is a view in vertical section taken on line 3 3 of Fig. 2. Fig. 4 is a plan view of the valve and operating mechanism, certain of the parts being shown in section. Fig. 5 is a view in sectional elevation taken on line 5 5 of Fig. 2. Fig. 6 is an end elevation of the operating mechanism for the valve. Fig. 7 is a detail sectional view of a portion of the parts shown in Fig. 6. Fig. 8 is a detail view in elevation of a stop and latch used in connection with my improved valve. Fig. 8ª is a detail view in vertical cross-section. Fig. 9 is a diagrammatic view of the air and gas valves and the connected flues.

Each valve normally rests upon a circular base-plate 10, which is adapted to be supported upon the brickwork, through which the inlet, outlet, and furnace flues pass. Plate 10 is provided with the air or gas inlet port 11, the diagonally opposite port 11ª, connected with the flue leading to the stack, and the intermediate flue-ports 12 and 12ª, through which the gases pass to and from the furnaces alternately. The ports are sector-shaped, as clearly shown in Fig. 2, and are provided with upturned shouldered flanges 13, and plate 10 is provided at its outer edge with the upturned flange 14, so that a circular channel 15 and diagonal channels 16 (at right angles to one another) are formed about and between the flanged ports for containing the sealing liquid.

The valve comprises a pair of inverted-D-shaped chambers 17, which are closed at the top, and a cylindrical open-top casing 18. The chambers 17 and the casing 18 are riveted at the bottom to a metal ring 19 and a cross-bar 20. The parts are held in their proper relative positions at the top by the angle-bars 21, secured to the tops of the D-chambers, the angle-bars 22, extending across the top of the open casing 18, and the bolts 23, which connect the two sets of angle-bars, as clearly shown in Fig. 3. The joints in these parts are made water-tight, so that they form a suitable jacket-space about the D-shaped chambers, to which water may be supplied in any suitable manner and in which the level is maintained above the top of the D-chambers by suitable overflow-pipes 23ª, screw-threaded onto ring 19 or removably secured thereto in any other suitable manner. The valve normally rests upon lugs 24 upon the shouldered flanges 13, with its outer lower edge in the circular channel 15, and the lower edge of the intermediate portion dividing the D-shaped chambers in one of the cross-channels 16, wherein said lower edges are sealed by the water supplied thereto from the overflow-pipes 23. Lugs 24 are provided, so that the cooling and sealing liquid may have ready access to both sides of the lower edge of the valve. The valve is provided with a central pivot 25, which is fitted within a suitable socket in the base-plate 10, and is adapted to be raised until the lower edges of the D-shaped chambers are above the tops of the flanges 13 and rotated through ninety degrees and then lowered so that the dividing-partition between the chamber 17 is moved from one of the cross-channels 16 into the other of said channels. For example, in the position shown in Figs. 2 and 9 the gases will pass from the inlet-port 11 through the flue-port 12 and the gases from the furnace will pass from the port 12ª through the outlet-port 11ª, while in the position of the valve indicated in dotted lines in Fig. 9 the direction of the gases passing to and from the furnace will be reversed. The lower outer edge of the valve is provided with a circular depending flange 26, preferably formed by extending the lower edge of the casing 18 below the base-ring 19, which is of sufficient length to remain immersed in the liquid in the circular channel 15 when the valve is raised and maintain the valve sealed while reversing. I thus provide a rotating reversing-valve all parts of which are cooled and which remains sealed at all times. Water is supplied through the open top of the water-jacket of the valve in any suitable manner, and preferably said supply is so regulated as to maintain the water within the jacket just below the boiling-point. The overflow from the jacket passes through the pipes 23ª into the sealing-channels 15 and 16. The overflow from these channels passes through notches 27 in the flange 14 into extensions 28 of the base-plate 10 and through overflow-pipes 29. The extensions 28 may be provided with vertically-moving regulating-plates 30, if desired, (see Fig. 2,) to regulate the level of the sealing liquid.

It is a great advantage to have an open-top water-jacket, since ample warning will be given if the water-supply should for any reason fail, as the water within the jacket would begin to steam and could even do so for some time without producing any deleterious effect. Also by having the water-jacket open at its top renders it easily accessible for cleaning and repairing.

Secured to each of the diametrically opposite extensions 28 is a pair of upwardly-extending channel-bars 31 and 32, the channel-bars 32 being extended for some distance above the tops of the channel-bars 31. (See Fig. 1.) A pair of horizontal channel-bars 33 is secured to and extends from the top of the channel-bars 31 to the channel-bars 32. These channel-bars, together with the brace-rods 34, form the framework upon which is mounted the mechanism for operating the valve. A casting 35 is secured to the top of the valve between the angle-bars 22, to which casting is secured the upright lifting-rod 36. (See Fig. 3.) The rod 36 extends upwardly between the channel-bars 33 and through an opening in a casting 37, secured to said channel-bars, and at its upper end is provided with a collar 38, securely held in place by a nut 39 and set-nut and lift-ring 40. Pivoted to the casting 41, secured to channel-bars 33, is a forked lever 42, which lever embraces the rod 36 and engages a collar 43, mounted loosely on the rod 36, beneath the collar 38. Bearing-balls 44 are interposed between the collars 38 and 43, which are provided with suitable raceways for said balls. (See Fig. 8ª.) Engaging the free end of the lever 42 is a sector-shaped cam 44ª, having a groove 45, in which the lever 42 rests. The cam 44ª is also provided at its corners with the friction-reducing rollers 46. The cam 44ª is keyed to a suitable shaft 47, mounted in bearings upon a casting 48, secured to the channel-bars 33 and 32. Also keyed to the shaft 47 at one end is a crank 49, having a crank-pin 50. Pivoted to a suitable casting 51, secured to one of the channel-bars 32, is a lever 52, connected at its lower end by a connecting-rod 53 to a lug upon the casting 35, secured to the top of the valve. The upper end of this pivoted lever is provided with a cam-shaped slot 54, which is engaged by the crank-pin 50 and is formed as clearly shown in Fig. 1—that is, wide at the top and contracted toward its lower end.

The shaft 47 is operated by a shrouded rack 55, operating upon a gear 56, keyed to the shaft and held in proper relative position by a grooved guide-roller 57. This rack forms an extension of a piston-rod 58, which is operated by a suitable motor, preferably a hydraulic cylinder 59, secured in place between the channel-bars 32 and provided at its upper end with an inlet and outlet port and pipe 60 and at its lower end with an inlet and outlet port and pipe 61. A counterweighted lever 62 is pivoted to a casting 63 at the upper end of the channel-bars 32 and is connected by links 64 with the free end of the operating-lever 42.

Assuming the parts to be in the position as shown in Figs. 1, 6, and 7, the operation of the parts thus far described is as follows: Water under pressure will be admitted through the pipe 60 to the upper end of the cylinder 59 and the rod 58 and rack 56 will be pulled downwardly. The cam 44ª and crank 59 will be rotated in the direction of the arrows shown in Figs. 1 and 7. The rack 56 is of such a length as to rotate the shaft 47 and its connected parts through three-fourths of a revolution. During the first third of the stroke the cam 44ª will lift the valve through the medium of the horizontal lever 42 and rod 36. The crank-pin 50 meanwhile simply moves from the upper end of the cam-slot 54 into the lower end without moving the lever 52. During the next third stroke the lever 42 will ride upon the concentric portion of the sector-cam 44ª and the valve will remain in this lifted position, with its lower edges clear of the flanges 13, around the ports in the plate 10; but the crank-pin 50 will engage in the contracted portion of the cam-slot 54 and will oscillate the lever 52, whereby the valve through the medium of the connecting-rod 53 will be rotated through ninety degrees about the bearing formed between the collars 38 and 43. During this movement the pivot 25 will act as a steadying-pin. During the last third of the stroke the valve will be seated in its reversed position, as the lever 42 and rod 36 will be lowered by the cam, the crank-pin 50 simply moving ineffectually from the lower contracted portion of the slot 54 into the upper portion thereof. Thus it will be seen that the valve is lifted, reversed, and lowered by a continuous operation of the shaft 47 in the same direction and by a single stroke in the same direction of the motor. When it is again desired to reverse the position of the valves, water under pressure will be admitted to the lower end of the cylinder 59 and the valve will then be raised, rotated in the opposite direction, and lowered until the parts are again in the positions shown in the figures of the drawings.

Stops 65 (see Fig. 2) are secured to the upper portion of the valve-casing 18, so as to contact in the normal and in the reverse positions of the valve with one or the other of the channel-bars 32 or 31, so as to arrest the valve in the proper position. Such valves have considerable weight and momentum, and in order to prevent them from rebounding after the stop has struck against its corresponding channel-bar I have provided hook-shaped latches 66. (Indicated in Fig. 1 and shown in detail in Fig. 8.) These latches are pivoted to one of the channel-bars and are surrounded by a guard 67 upon the other of said channel-bars and rest against a stop-pin 68. A swinging triangular-shaped pendulum-guard 69 is pivoted to the latch to prevent the latch 66 from engaging the stop 65 when the valve is raised. When, however, one of the stops 65 is swung in its raised position toward the latch, the pendulum-guard will be knocked to one side and the latch will engage with the stop, thereby preventing the valve from rebounding.

It is usually necessary to provide in such furnaces at least two reversing-valves, one for the air and one for the gas, in the manner indicated in the diagrammatic view, Fig. 9. Both the air and gas valves, as shown, are provided with inlet-ports 11, connected to the air and gas inlet flues, and outlet ports 11ª, connected to the flue leading to the stack, together with the intermediate ports 12 and 12ª, opening into flues leading to opposite sides of the furnace. This arrangement of flues is indicated in Fig. 9; but it will be understood that some other modified arrangement may be used instead. If the valves are in the position shown by full lines in this figure, the gases will flow to and from the furnace, as shown by the arrows in full lines. If, however, the valves are reversed to occupy the position shown in dotted lines, the course of the gases will then be in the direction indicated by the arrows shown in the dotted lines. It is obvious that if one of the valves should occupy the position shown in full lines and the other should occupy the position shown in dotted lines the air and gas would not be sent through the furnace in the same direction. When one valve is reversed by the operator, he must also, therefore, reverse the other valve. In order to obviate any disarrangement in the proper setting of the valves and in order also that both valves may be reversed by the operation of a single handle, I connect the pipes 60, opening into one end of each of the cylinders 59, to the pipe 70 and both pipes 61, opening into the opposite ends of the cylinders, to the pipe 71. These pipes 70 and 71 are connected up to a supply-pipe 72 and exhaust-pipe 73 by any suitable form of four-way valve 74. It is obvious, therefore, that by use of such a valve water under pressure may be supplied simultaneously to either end of both cylinders and exhausted from the opposite ends and that by the use of such a four-way valve the operator is enabled to reverse both the air and gas valves by simply moving the handle of the valve 74 in one direction or the other.

It is obvious that the features of my invention may be varied by the skilled mechanic without departing from the essentials of the invention claimed, and I do not, therefore, wish to be limited to the precise details of construction set forth.

Having thus described my invention, what I claim as new, and desire to secure by Letters Patent, is—

1. The combination with inlet and outlet ports and a pair of flue-ports, all arranged in the same horizontal plane, of a movable valve mounted above said ports having a pair of chambers spaced apart from one another for alternately connecting said inlet and outlet ports with each of said flue-ports and a casing surrounding and spaced apart from said chambers and extending above the same to form a water-jacket.

2. In reversing-valves for regenerative furnaces, the combination with oppositely-arranged inlet and outlet ports and a pair of intermediate flue-ports, all located in the same horizontal plane, of a rotatable valve mounted above said ports having a pair of chambers for alternately connecting said inlet and outlet ports with each of said flue-ports, said chambers being spaced apart from one another, and each having side walls and a closed top and a cylindrical open-topped casing surrounding said chambers, extending above the tops thereof and spaced apart from said side walls to form a water-jacket.

3. In reversing-valves for regenerative furnaces, the combination with oppositely-arranged sector-shaped inlet and outlet ports and a pair of intermediate sector-shaped flue-ports, all located in the same horizontal plane, of a rotatable valve mounted above said ports having a pair of oppositely-disposed D-shaped chambers for alternately connecting said inlet and outlet ports with each of said flue-ports, said chambers being spaced apart from one another and each having side walls and a closed top and an open-top cylindrical casing surrounding said chambers, extending above the tops thereof and spaced apart from said side walls to form a water-jacket.

4. In reversing-valves for regenerative furnaces, the combination with oppositely-arranged inlet and outlet ports and a pair of intermediate flue-ports, all located in the same horizontal plane and with channels about said ports for containing sealing liquid, of a rotatable valve mounted above said ports having a pair of chambers for alternately connecting said inlet and outlet ports with each of said flue-ports, said chambers being spaced apart from one another and having their lower edges seated within said channels to be sealed by the liquid therein and a cylindrical casing surrounding and spaced apart from said chambers and extending above the same to form a water-jacket, the lower edge of said casing being extended below the lower edges of said chambers and into said channel, whereby it is sealed by the liquid therein as the valve reverses.

5. In a rotatable valve for regenerative furnaces, a bottom ring-frame having a cross-bar, a pair of oppositely-disposed D-shaped chambers spaced apart from one another, each having side walls and a closed top and secured at its lower end to the inner periphery of said ring-frame and to said cross-bar and an open-top cylindrical casing surrounding said chambers and extending above the tops thereof to form a water-jacket, said casing being secured at its lower end to the outer periphery of said ring-frame.

6. In a rotatable reversing-valve for regenerative furnaces, a bottom ring-frame, a pair of chambers spaced apart from one another and each having side walls and a closed top and secured at its lower end to said ring-frame, a cylindrical open-top casing surrounding said chambers, extending above the tops thereof and spaced apart from said side walls to form a water-jacket, a cross bar or bars extending across the top of said cylindrical casing and supporting-rods secured to said cross bar or bars and to the tops of said chambers.

7. In reversing-valves, the combination of a plate having ports, channels about said ports for containing a sealing liquid, a valve cooperating with said ports and adapted to be seated within said channels to be sealed by the liquid therein, a water-jacket surrounding said valve and an overflow-pipe leading from said valve-jacket, arranged to maintain cooling liquid therein at a predetermined level and discharging into said channel.

8. In reversing-valves for regenerative furnaces, the combination with inlet and outlet ports and a pair of flue-ports, all located in the same plane, of a valve mounted above said ports having a pair of chambers for alternately connecting said inlet and outlet ports with each of said flue-ports, a casing surrounding and spaced apart from said chambers and extending above the same to form a water-jacket and an overflow connected to said water-jacket for maintaining cooling liquid therein above the tops of said chambers.

9. In reversing-valves for regenerative furnaces, the combination with the oppositely-disposed inlet and outlet ports and the pair of intermediate flue-ports, all located in the same plane, and with channels for containing sealing liquid about said ports, of a rotatable valve mounted above said ports with its lower edges extending within said channels, a supporting-rod fixed to the upper end of said valve, a bearing-block rotatably mounted upon the upper end of said rod, a pivoted lever engaging said bearing-block, a rotatable shaft having fixed thereto a sector-shaped cam operatively engaging said pivoted lever, a crank mounted on said shaft and connections between said crank and said valve whereby said valve may be raised, reversed and lowered by the rotation of said shaft in one direction.

10. In reversing-valves for regenerative furnaces, the combination with inlet and outlet ports and a pair of intermediate flue-ports, all located in the same plane, and with channels for containing sealing liquid about said ports, of a rotatable valve mounted above said ports with its lower edges extending within said channels, a rotatable shaft, means operated by said shaft for raising and lowering said valve, a crank-arm on said shaft and a pivoted lever connected to said valve and having a cam-slot engaging said crank for reversing said valve when in its raised position.

11. In reversing-valves, the combination with inlet, outlet and flue ports, of a movable valve therefor, a water seal for the lower edges of said valve, a rotatable shaft having a cam and a crank-pin, a horizontally-pivoted lever connected to said valve and cooperating with said cam, a vertically-pivoted lever connected to said valve and having a cam-slot cooperating with said crank-pin, whereby said valve may be raised, reversed and lowered, substantially as described.

12. In reversing-valves for regenerative furnaces, the combination with oppositely-arranged inlet and outlet ports and a pair of intermediate flue-ports, all located in the same plane, of a valve mounted above said ports having chambers for alternately connecting said inlet and outlet ports with each of said flue-ports, a water seal about said ports for the lower edges of said valve, a rotatable shaft having a cam and a crank-pin, a pair of pivoted levers respectively arranged to be operated by said cam and said crank and connections between each of said levers and said valve, whereby the latter may be raised, reversed and lowered by the continuous rotation of said shaft in the same direction.

13. In reversing-valves for regenerative furnaces, the combination with inlet and outlet ports and a pair of intermediate flue-ports, all located in the same horizontal plane and with channels for containing sealing liquid about said ports, of a rotatable valve mounted above said ports with its lower edges extending within said channels, a shifter arranged to raise and lower said valve at the beginning and end respectively of its stroke, a second shifter arranged to reverse said valve, and a movable member connected to operate said shifters and having a pin-andslot lost-motion connection with said second shifter, whereby the valve will be raised, reversed and lowered during a single stroke of said movable member in one direction.

14. In reversing-valves, the combination with inlet, outlet and flue ports, of a valve therefor, a water seal for the lower edges of said valve, means for raising, reversing and lowering said valve, stops for limiting the extent of its movement and catches for engaging said stops.

15. In reversing-valves, the combination with inlet, outlet and flue ports, of a valve therefor, a water seal for the lower edges of said valve, means for raising, reversing and lowering said valve, stops for limiting the extent of its movement, catches for engaging said stops and guards for said catches.

16. In reversing-valves, the combination with inlet, outlet and flue ports, of a valve therefor, a water seal for the lower edges of said valve, means for raising, rotating and lowering said valve, stops on said valve for limiting the extent of its rotation, pivoted catches for engaging said stops and pendulum guard-plates pivoted to said catches, whereby the catches will only engage said stops as the valve is rotated toward said catches in its raised position.

17. In reversing-valves for furnaces, the combination of air and gas inlet and outlet ports and flue-ports, of a pair of rotatable, water-sealed reversing-valves for alternately connecting said air and gas inlet ports and said outlet-ports with said flue-ports, a motor for raising, reversing and lowering each of said valves and a single controlling-valve for both of said motors.

18. In reversing-valves for furnaces, the combination with air and gas inlet and outlet ports and flue-ports, of a pair of reversing-valves for alternately connecting said air and gas inlet ports and said outlet-ports with said flue-ports, a pair of motor-cylinders for reversing said valves, a four-way valve, and pipes connecting each end of each of said cylinders with said four-way valve, whereby said cylinders may be simultaneously thrown into operation for reversing said air and gas valves.

JULIUS A. DYBLIE.

Witnesses:
  LEM NORTHAM,
  WILLIAM GRINTON.